(12) United States Patent
Vaarbroe et al.

(10) Patent No.: US 8,638,964 B2
(45) Date of Patent: Jan. 28, 2014

(54) METHOD FOR MANUFACTURING A HEARING AID HAVING A CUSTOM FITTED RESILIENT COMPONENT

(75) Inventors: Klaus Henrik Vaarbroe, Skovlunde (DK); Tina Ahlberg Larsen, Birkerød (DK); Lars Baekgaard Jensen, Farum (DK)

(73) Assignee: Widex A/S, Lynge (DK)

( * ) Notice: Subject to any disclaimer, the term of this patent is extended or adjusted under 35 U.S.C. 154(b) by 136 days.

(21) Appl. No.: 13/083,064

(22) Filed: Apr. 8, 2011

(65) Prior Publication Data

US 2011/0182451 A1 Jul. 28, 2011

Related U.S. Application Data

(63) Continuation-in-part of application No. PCT/EP2008/063663, filed on Oct. 10, 2008.

(51) Int. Cl.
*H04R 25/00* (2006.01)

(52) U.S. Cl.
USPC .............................. 381/322; 381/324; 381/328

(58) Field of Classification Search
USPC ......................................... 381/322, 324, 328
See application file for complete search history.

(56) References Cited

U.S. PATENT DOCUMENTS

| | | | |
|---|---|---|---|
| 4,870,688 A | 9/1989 | Voroba et al. | |
| 6,305,661 B1 * | 10/2001 | Kennedy | 249/117 |
| 7,110,562 B1 * | 9/2006 | Feeley et al. | 381/322 |
| 7,578,335 B2 * | 8/2009 | Hetzner et al. | 164/4.1 |
| 2003/0080016 A1 * | 5/2003 | Lipper | 206/459.5 |
| 2006/0121223 A1 * | 6/2006 | Chisholm et al. | 428/35.7 |
| 2007/0286448 A1 * | 12/2007 | Sato | 381/424 |
| 2008/0073804 A1 * | 3/2008 | Matsuzawa et al. | 264/2.6 |
| 2010/0326429 A1 * | 12/2010 | Cumpston et al. | 126/710 |

FOREIGN PATENT DOCUMENTS

| | | |
|---|---|---|
| WO | 02/078233 A2 | 10/2002 |
| WO | 2007/000160 A1 | 1/2007 |
| WO | 2008/010716 A2 | 1/2008 |

OTHER PUBLICATIONS

International Search Report for PCT/EP2008/063663 dated Feb. 9, 2009.
Office Action for JP 2011-530375 dated Dec. 4, 2012, with English translation.

* cited by examiner

*Primary Examiner* — Brian Ensey
*Assistant Examiner* — Katherine Faley
(74) *Attorney, Agent, or Firm* — Sughrue Mion, PLLC (57) ABSTRACT

A method for manufacturing a hearing aid component adapted for fitting in the auditory canal of a hearing aid user, the hearing aid component having a covering of resilient material on at least part of its outside surface and having an inner sound conveying part, the method including the steps of acquiring data representing the shape of the auditory canal of the user; forming a three-dimensional computer model of the shape of the hearing aid component based on the acquired data; forming a three-dimensional computer model of a mould for casting the covering; manufacturing the mould in a rapid prototyping process based on the three-dimensional model; casting the covering in the mould; removing the mould from the covering; and forming the hearing aid component by joining the covering with the inner sound conveying part.

16 Claims, 6 Drawing Sheets

Fig. 1

PRIOR ART

PRIOR ART

METHOD FOR MANUFACTURING A HEARING AID HAVING A CUSTOM FITTED RESILIENT COMPONENT

RELATED APPLICATIONS

The present application is a continuation-in-part of application No. PCT/EP2008063663, filed on Oct. 10, 2008, in Europe and published as WO2010040419 A1.

BACKGROUND OF THE INVENTION

1. Field of the Invention

The present invention relates to hearing aids and to methods of making hearing aids. The invention more specifically concerns a method for manufacturing a hearing aid component adapted for fitting in the auditory canal of a hearing aid user, said hearing aid component being provided with a resilient material on at least its outside surface, the method comprising acquiring data representing the shape of the auditory canal of a hearing aid user.

2. Prior Art

It is known to manufacture custom fitted ear plugs for hearing aids, or custom fitted in-the-ear hearing aids in hard non-resilient materials. These are typically manufactured by making an impression of the ear, including the auditory canal, of the hearing impaired person. From this impression the ear plug or hearing aid may be manufactured by different techniques. See e.g. WO 02/078233.

When ear plugs are manufactured in resilient material it is known to make a mould directly from the impression of the ear and ear canal. The resilient ear plug is then cast in this mould. It is also known to make an impression in silicone directly from the ear, and then apply this silicone impression with some modifications as an ear plug, e.g. after providing space for arranging the receiver.

One of the more commonly used techniques comprises performing a scanning of the ear impression or a direct scan of the auditory canal in order to obtain data for a three dimensional computer model of the auditory canal. This model can be used when designing e.g. a custom fitted ear plug or a shell for an in-the-ear hearing aid. Such ear plugs or shells can be manufactured by the rapid prototyping processes. In such processes the three dimensional shape of e.g. an ear plug is divided into a number of thin cross-sectional layers (typically about 0.1 mm). The ear plug or hearing aid shell is then built up layer by layer in an additive process. One example of a rapid prototyping process is Stereo Lithography (SLA), where a container of photosensitive resin contains a vertically-moving platform. The ear plug or hearing aid shell under preparation is supported by the platform that moves down by decrements that determine the layer thickness for each layer. A laser beam traces out the shape of the intended specimen in a respective layer to harden the photosensitive resin along the trace. The process repeats until the ear plug or hearing aid shell is complete.

Another example of a rapid prototyping process is Selective Laser Sintering (SLS), where two powder magazines are placed on either side of a work area. A leveling roller moves powder over from one magazine, crossing over the work area to the other magazine. The laser then traces out the shape of the specimen. The work platform moves down by the thickness of one layer and the roller then moves in the opposite direction, thereby moving powder over the work area from a different magazine. Also this process repeats until the ear plug or hearing aid shell is complete.

One problem with rapid prototyping is that this method is only suited for relatively hard and non-resilient materials. The material in which hearing aid components are manufactured by this technique is often acrylic or something with an equivalent hardness. Resilient or soft materials for hearing aid plugs are only known from standard, not custom fitted, ear plugs.

It is known from WO 2007/000160 to shape a tube for conveying sound into a given shape. The tube is shaped by placing it in a tool manufactured using a rapid prototyping process. The tool will form the tube in the preferred shape, and when heating and afterwards cooling the tube this shape is maintained when the tube is removed from the tool.

Often there is a need for custom fitted ear moulds or custom fitted in-the-ear hearing aids with a soft or resilient outer surface, where this surface is intended for contacting the auditory canal. A soft and resilient outer surface of the component of the hearing aid in contact with the auditory canal wall will more easily adapt to the shape of the auditory canal wall, and thereby be more comfortable to the hearing aid user. Furthermore, a soft and resilient outer surface will make continuous adaptation to changes in the geometry of the ear canal feasible. Such changes in geometry may be caused when the hearing aid user is chewing or yawning.

For many users a soft, pliable and resilient ear plug which is custom fitted to the individual shape of the auditory canal will be the optimum solution as this will avoid localized mechanical pressure in the auditory canal. The problem is that this type of ear plugs is relatively time consuming to manufacture with the existing methods, since these methods are more or less manual.

SUMMARY OF THE INVENTION

It has, therefore, been a feature of the present invention to provide a method for manufacturing custom fitted ear moulds with a soft, pliable and resilient surface in an automated computer controlled process.

The invention, in a first aspect, provides a method for manufacturing a hearing aid component adapted for fitting in the auditory canal of a hearing aid user, said hearing aid component having a covering of resilient material on at least part of its outside surface and said hearing aid component having an inner sound conveying part, said method comprising the steps of, acquiring data representing the shape of the auditory canal of a hearing aid user, forming a three-dimensional computer model of the shape of the hearing aid component based on the acquired data, forming a three-dimensional computer model of a mould for casting the covering, manufacturing said mould in a rapid prototyping process based on said three-dimensional computer model of the mould, casting the covering in the mould, removing the mould from the covering, and forming said hearing aid component by joining the covering with the inner sound conveying part, wherein said mould is provided with a wall thickness of 0.4 mm or less.

The inner sound conveying part may be any canal or opening in the hearing aid component prepared for conveying sound from the receiver to the inner space of the ear canal in from of the ear drum.

This method has the advantage of providing a method for manufacturing custom fitted hearing aid components with resilient material in a fast process. Another advantage is that the component provided by this method can be directly applied as a hearing aid component without the need for e.g. removing material in order to provide space for the receiver or to make a ventilation canal. Furthermore, it is easy to provide an extra identical hearing aid component without disturbing the hearing aid user again. It will also be possible to provide a hearing aid component with a more complicated shape compared to the possibilities of known methods.

In a further embodiment of the invention the hearing aid component is an ear plug. The ear plug is provided with resilient material at least on its outside surface, but is preferably made from resilient material alone. Preferably, the ear plug is provided with an opening extending from the back end side to the front end side of the ear plug, thus providing space for a receiver which will be able to transmit sound into the space between the earplug and the eardrum when the hearing aid is in use.

In a further embodiment of the invention the hearing aid component is a part of an in-the-ear hearing aid adapted for placement in the ear canal. An in-the-ear hearing aid is one compact unit as opposed to a behind-the-ear hearing aid where at least the signal processing unit, the microphone and the battery are placed in a housing behind the ear from where either an electrical signal is sent through leads to a receiver placed in an ear plug, or, the sound is conveyed from a receiver in the housing through a tube to the ear plug. The unit of the in-the-ear hearing aid is usually placed partly inserted in the ear canal and partly right outside the ear canal. Typically the shell comprising the in-the-ear hearing aid is custom fitted, e.g. manufactured by a rapid prototyping process.

In a further embodiment of the invention the resilient material is injected into the mould before casting the resilient material. This is performed by use of an injector.

In a further embodiment of the invention the resilient material has a hardness below Shore 60A, when the resilient material is in its final form, i.e. after casting and hardening. Such hardness has been found to be pleasant to most hearing aid users, and to offer the benefits of a resilient material as described above.

Preferably, the resilient material is silicone, and preferably this silicone is a two component material vulcanizing or setting at room temperature after mixing. The mixing of the two components may be performed in the injector. The setting at room temperature has the advantage of avoiding a further process step, such as treatment with heat or UV light.

The invention, in a second aspect, provides a hearing aid comprising a hearing aid component adapted for being placed in the auditory canal of a hearing aid user, said hearing aid component having a covering of a resilient material a method for manufacturing a hearing aid component adapted for fitting in the auditory canal of a hearing aid user, said hearing aid component having a covering of resilient material on at least part of its outside surface and said hearing aid component having an inner sound conveying part, said method comprising the steps of, acquiring data representing the shape of the auditory canal of a hearing aid user, forming a three-dimensional computer model of the shape of the hearing aid component based on the acquired data, forming a three-dimensional computer model of a mould for casting the covering, manufacturing said mould in a rapid prototyping process based on said three-dimensional computer model of the mould, casting the covering in the mould, removing the mould from the covering, and forming said hearing aid component by joining the covering with the inner sound conveying part, wherein said mould is provided with a wall thickness of 0.4 mm or less.

BRIEF DESCRIPTION OF THE DRAWINGS

Embodiments of the invention will now be explained in further detail with reference to the figures.

DETAILED DESCRIPTION OF THE INVENTION

Figure 1:
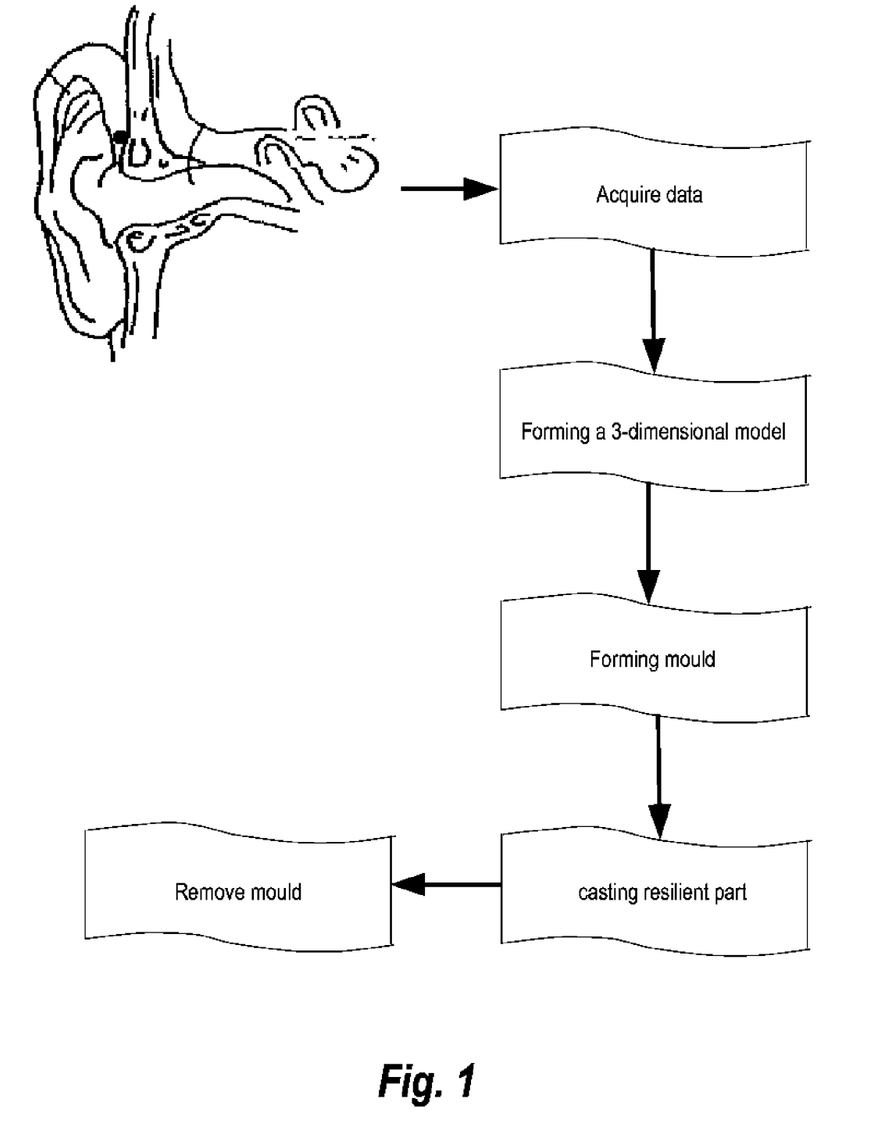
FIG. 1 illustrates schematically process steps in an embodiment of the invention for manufacturing a resilient ear mould.

An example of the method according to the invention is given in FIG. 1. Data representing the shape of the auditory canal are acquired and stored in a computer. These data can be acquired in several ways, e.g. by making an impression of the ear of a hearing aid user including the auditory canal and then scanning and digitizing the outer contour of this impression. Commercial scanners are available for this purpose. Data representing the shape of the auditory canal may also be obtained by other means such as direct scanning of the auditory canal by laser, X-rays, ultrasound etc. Three dimensional laser scanners for this purpose are known.

Once the data representing the shape of the auditory canal have been stored in a computer, these data can be applied for producing a three-dimensional computer model of an ear plug or an in-the-ear hearing aid fitting the auditory canal of the hearing aid user.

In a method according to the invention a mould for casting an ear plug is established in the form of a three dimensional computer model. This mould is designed to be manufactured in a rapid prototyping process, and the mould is typically prepared for easy removal from the cast ear plug.

The mould is designed such that its inner dimensions will fit the wanted outer dimensions of the cast ear plug. However, any predictable changes in material dimensions, such as shrinkage, of the ear plug material during or after casting should be accounted for, i.e. the mould should be produced correspondingly larger in order to take shrinkage into account, such that the size of the finished ear plug will fit the ear. Also when designing the mould, shrinkage of the hard material, such as acrylic or polyamide, applied for the mould should be taken into account.

When manufacturing hollow hard ear plugs of e.g. acrylic by an SLA rapid prototyping process the wall thickness of the shell is often selected to be in the range 0.4-0.8 mm, preferably about 0.7 mm. However, it has been found that when applying the rapid prototyped mould for casting the ear plug in a resilient material, a wall thickness of the relatively hard material of 0.3-0.4 mm, preferably 0.3 mm or less, has the advantage that this relatively hard material is easy to crush and remove from the finished resilient ear mold. Other methods for removing the finished ear plug from the mould are also possible. This could e.g. be introduction of crack initiation lines in the mould along which separation into two or more parts would be easily accomplished. When applying an SLS rapid prototyping process polyamide could be used instead of acrylic.

Traditionally, the material for a rapid prototyping process manufactured hard ear plug is limited by the necessity of the material to be biocompatible, meaning that humans can tolerate exposure to specimens of the material in their auditory canal for extended time periods without any harmful effect and without any undesired skin reactions, such as allergy, irritation or toxic reactions. Biocompatibility is further defined in the standard ISO 10993. Acrylic has often been preferred for the purpose. However, when the rapid prototyping process manufactured hard material is applied as a mould for casting, the hard material will not come into contact with the skin of the hearing aid user. Therefore, other materials, such as epoxy or other traditional materials for a rapid prototyping process could be used for forming the mould.

In general the resilient hearing aid component should be manufactured from a biocompatible material, and this material should not absorb any compounds from the harder mould material, which compounds could be releasable during use of the hearing aid component.

A resilient material will be understood as being a material resuming its original shape after compression, i.e. energy may be absorbed when deforming the material, and this energy is recovered when the deformation is removed.

Furthermore, the resilient hearing aid component should preferably be manufactured from a material having a hardness which is below 80 measured on the Shore durometer type A scale (see the standard ASTM D2240 for description of the test). This is often written as Shore 80A. Preferably, the hardness is below Shore 60A, and more preferably the hardness is in the range from Shore 20A to Shore 45A.

One material in which the resilient hearing aid component could preferably be manufactured is silicone. A preferred silicone is the Biopor, which is biocompatible. However, other resilient materials, such as soft acrylic may also be applied. Preferably the material is injected into the finished mould. When silicone is applied this may be in the form of a hot vulcanization silicone which often has to be vulcanized at a temperature of e.g. 220° C. The silicone may also set by application of ultraviolet light. In a preferred embodiment the silicone is in the form of a two component silicone where the two components may be mixed in the injector just before injecting the material into the mould. After mixing the two components, the silicone will vulcanize or harden at room temperature in approximately 20 minutes. A pressure may be applied while the silicone is hardening. Such a pressure may have the advantage of increasing the diffusion of air bubbles such that these are removed from the liquid silicone. Thereby the number of air bubbles in the finished hearing aid component can be significantly reduced. An example of a pressure applied to the silicone in the mould is approximately 5 bar.

Other examples of materials which could be applied for the resilient hearing aid component are thermoplastic elastomers (TPE) and liquid silicone rubber (LSR).

One advantage with the method according to the invention is that grinding of the resilient hearing aid component in any form is usually not necessary. A finished ear plug or hearing aid component may be lacquered with a layer of e.g. vulcanizing lacquer. Different types of lacquer exist; these may provide the surface with different properties, such as a specific frictional coefficient, improved cleaning ability or improved resistance to microbiological growth. Also, more than one layer of lacquer may be applied in order to obtain specific surface properties. However, many ear plugs manufactured according to the method of the invention will be applied directly without any layer of lacquer. The hardened lacquer would also have to be biocompatible.

Often a manufactured ear plug will have to encase the receiver of the hearing aid. Therefore, in this situation space for the receiver and preferably holding means for holding the receiver should be included in the manufacturing of the ear mould. Such holding means should therefore also be part of the three dimensional model of the ear plug. The holding means for holding the receiver may also be a separate component adapted to the receiver and fitting into the space in the earplug where the receiver is to be arranged.

The space for the receiver is designed with shape and dimensions such that the specific receiver for the hearing aid selected for the hearing aid user will fit into the earplug. Furthermore, an open canal should connect the sound generating part of the receiver with the part of the ear plug arranged to face the ear drum of the hearing aid user. There will thus be direct access for the sound from the receiver to the ear drum. Means for holding e.g. a grid for preventing earwax in getting into the receiver may also be arranged as part of the ear plug.

In a number of situations the ear plug will extend not only in the ear canal but also in part of the concha. The receiver could e.g. be arranged in the part of the ear plug extending in the concha, where the space will be less limited compared to the ear canal. This is especially the situation for children. When the receiver is placed in the concha part of the ear plug, the canal conveying sound from the receiver to the space in front of the ear drum may be bended.

Often the ear plug will have to be applied with a behind-the-ear hearing aid where the receiver is arranged in the behind-the-ear part, and where a tube is guiding the sound from the receiver to the ear plug and through the ear plug. In this case the ear plug will be provided with means for holding the tube.

Figure 2:
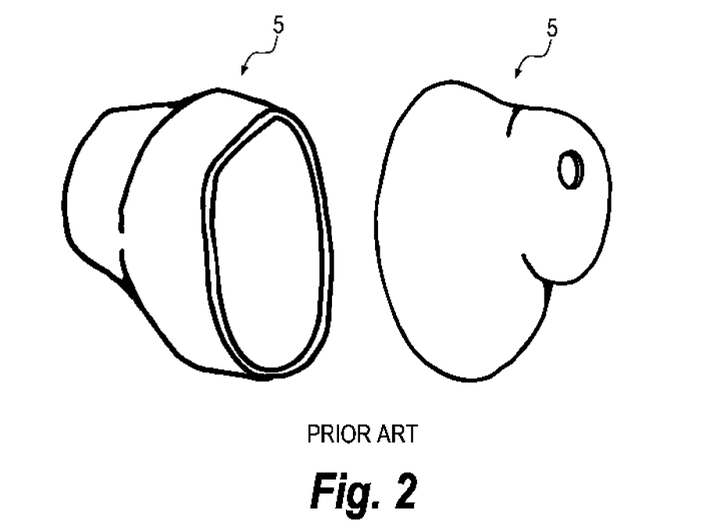
FIG. 2 illustrates two views of a prior art ear plug manufactured by a rapid prototyping process.

In one embodiment according to the invention, the resilient hearing aid component manufactured is a resilient ear plug. FIG. 2 illustrates a prior art ear plug 5 manufactured by a rapid prototyping process. This ear plug is manufactured in a relatively hard non-resilient material and will often be ready to use, maybe after grinding or polishing. This ear plug cannot be applied as mould for a resilient earplug, partly because the outer dimensions of the resilient ear plug will have to be equivalent with the outer dimensions of the hard ear plug in FIG. 2, which is not possible if applying the hard ear plug as mould for the resilient ear plug. Also, the known ear plug 5 is usually provided with means for holding the receiver. However, it has been found that the software for designing the hard ear plug can also be applied for designing the mould for casting the resilient earplug.

Figure 3:
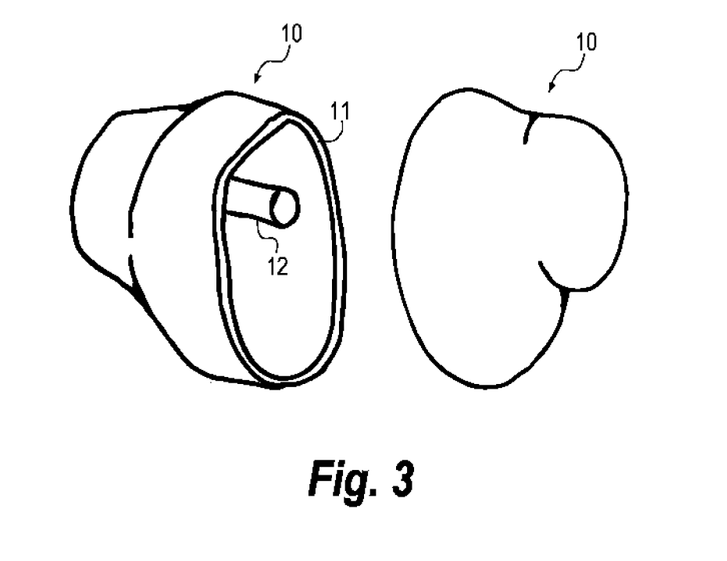
FIG. 3 illustrates two views of a mould for casting a resilient ear plug.

FIG. 3 illustrates such a mould 10 for casting a resilient ear plug in e.g. silicone. The mould 10 has been modeled as a three dimensional model on a computer and has been manufactured by a rapid prototyping process. The mould 10 in this example comprises an outer shell 11 and an inner core 12. The outer shell 11 will be applied for casting the earplug with an outer surface. The inner core 12 can be removed from the finished earplug, whereby a space will be created inside the earplug into which the receiver can be inserted. This space may also be provided with means for holding the receiver and preferably locking the receiver or a tube into the correct position. These holding means can be in the form of a recess or an edge, fitting with corresponding means on the receiver. The inner core 12 may be provided with any shape necessary for fitting the shape of the receiver. When a ventilation canal is needed in the ear plug, a second inner core needs to be arranged as part of the mould. This second inner core also has to be arranged inside the outer shell 11.

Figure 4:
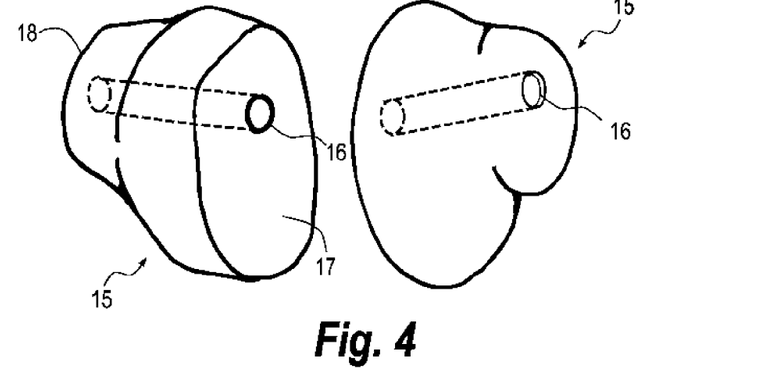
FIG. 4 illustrates two views of an ear plug made in a resilient material.

FIG. 4 illustrates an ear plug 15 made in a resilient material cast in the mould in FIG. 3. The resilient material may be transparent or translucent or it may be opaque given any color. The cylindrical opening 16 extending from the back end 17 to the front end 18 of the ear plug 15 is for placement of the receiver. If a canal for ventilation is needed, a further opening (not shown) from the back end 17 to the front end 18 of the ear plug should be arranged.

Figure 5:
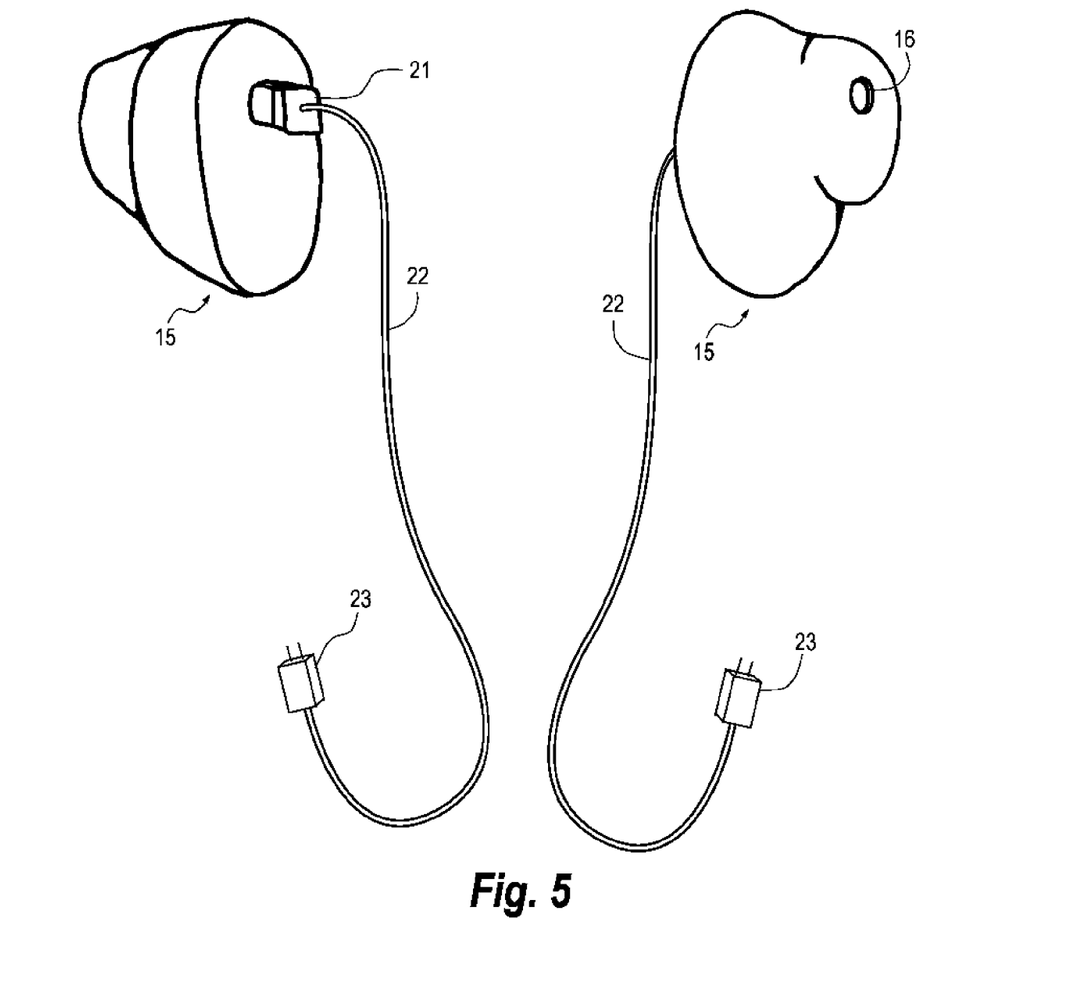
FIG. 5 illustrates two views of an ear plug with a receiver.

In FIG. 5 the ear plug 15 of FIG. 4 has been mounted with a receiver which has been arranged in the cylindrical opening 16. A first plug 21 is engaged in a socket (not shown) in contact with the receiver. This first plug 21 connects the receiver through a lead 22 to a second plug 23 adapted for engaging a socket in a casing housing electronics of the hearing aid. This casing will typically be of the behind-the-ear type.

Figure 6:
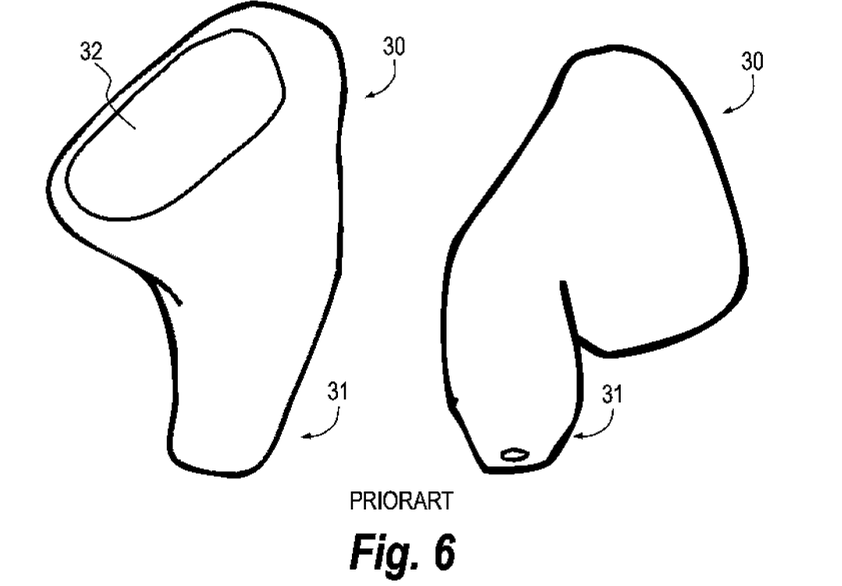
FIG. 6 illustrates two views of a prior art shell of an in-the-ear hearing aid.

In an embodiment according to the invention a resilient hearing aid component, being part of an in-the-ear hearing aid, is manufactured. FIG. 6 illustrates a shell 30 of a known in-the-ear hearing aid with a hearing aid part 31 adapted for fitting closely into the ear canal of the hearing aid user. Such shells are typically made directly by a rapid prototyping process based on a three dimensional computer model of the hearing aid user's ear and ear canal. Traditionally, the hard material, e.g. acrylic, from which the shell is made, has been arranged to be in direct contact with the ear canal. However, with the method according to the invention it is possible to manufacture a custom fitted hearing aid where the part in contact with the ear canal, can be manufactured from a resilient material, thereby obtaining the advantage of such a material.

In order to manufacture such a hearing aid shell a two phase process is preferred, where the hard part of the shell is manufactured in one phase and the resilient hearing aid component is manufactured in a different phase. The two parts are then integrated into the hearing aid shell.

Figure 7:
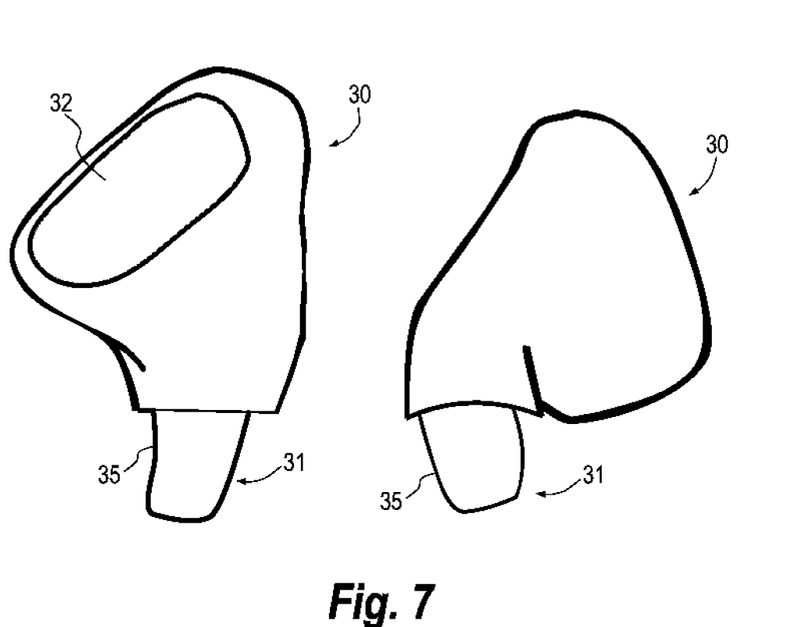
FIG. 7 illustrates two views of the shell of FIG. 6 where a part has been recessed.

FIG. 7 illustrates a result of a phase manufacturing the hard part of the shell. In this phase a part 31 of the shell, arranged to be inserted deepest into the ear canal of the hearing aid user, has been contracted or recessed to exhibit a reduced cross-section. This recessed part 35 is made when forming the three dimensional computer model of the shape of the shell. The recessed part will be covered in a way to be explained below by a covering in the form of a cup-shaped sheath, covering or envelope of a resilient material. The hard part of the shell could have a material thickness in the range 0.4-0.8 mm, preferably approximately 0.7 mm. This thickness will preferably also apply for the recessed part 35. The distance of the recess is the step between the non-recessed and the recessed part which equals the distance between the surface of the hard material and the outer surface of the resilient hearing aid component. The step therefore equals the thickness of the resilient part to be placed around the recessed part. Two opposing needs should be balanced when selecting this step. With a larger step more resilient material will be present between the hard surface and the wall of the ear canal. This will make the resilient hearing aid component more flexible. However, since the dimensions of a hearing aid user's ear canal are approximately constant, a larger step will lead to smaller dimensions and less space inside the hearing aid shell. This may be a problem when arranging the placement of the receiver. Often a step of the recess in the range 0.5-1 mm is preferred.

Figure 8:
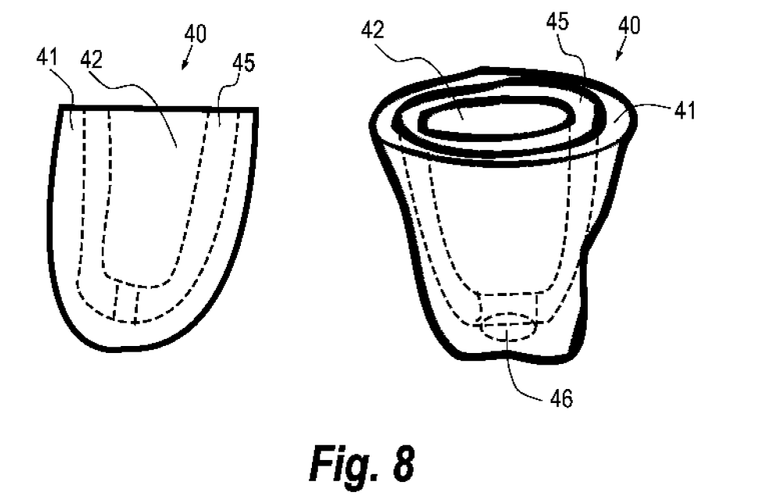
FIG. 8 illustrates two views of a mould for casting a resilient part for the shell in FIG. 7.

FIG. 8 illustrates a mould 40 for casting a resilient hearing aid component 50 (see FIG. 9) which will fit the recessed shell part 35 in FIG. 7. The mould 40 is designed by forming a three dimensional computer model of the hearing aid shell 30 including the resilient component 50. During this modeling step the shape and the dimensions of the resilient hearing aid component 50 will also be decided. Based on the shape and dimensions of the resilient hearing aid component the mould 40 for casting the resilient hearing aid component 50 can be formed as a three dimensional computer model. From this model the mould 40 is manufactured in a rapid prototyping process. The mould 40 will typically comprise an outer layer 41 and an inner core 42 between which there is an open space 45 in which the resilient hearing aid component 50 can be cast. The dimensions of the inner core 42 equals the dimensions of the recessed hard part 35 of the hearing aid shell.

Figure 9:
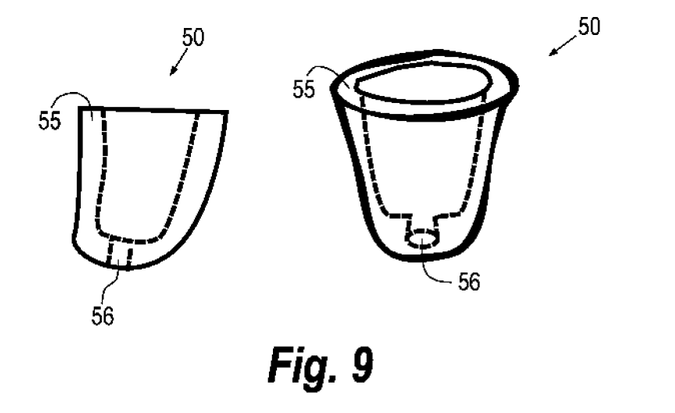
FIG. 9 illustrates two views of a resilient part cast in the mould of FIG. 8.

FIG. 9 illustrates a resilient hearing aid component 50 cast in the mould of FIG. 8. The resilient component 50 in this embodiment is to some extent cup shaped with a wall 55 having a thickness defining the thickness of the resilient layer, and an outer surface which, in the finished hearing aid component, will be in contact with the ear canal of the hearing aid user. Furthermore, an opening 56 is provided in the bottom of this cup shape. This opening 56 is often circular or substantially circular in shape, and has the purpose of allowing sound from the receiver to reach the space between the part of the hearing aid inserted in the ear canal and the ear drum. The opening 56 is made during casting the resilient hearing aid component 50 by having means 46 for forming the opening as part of the mould 40.

Figure 10:
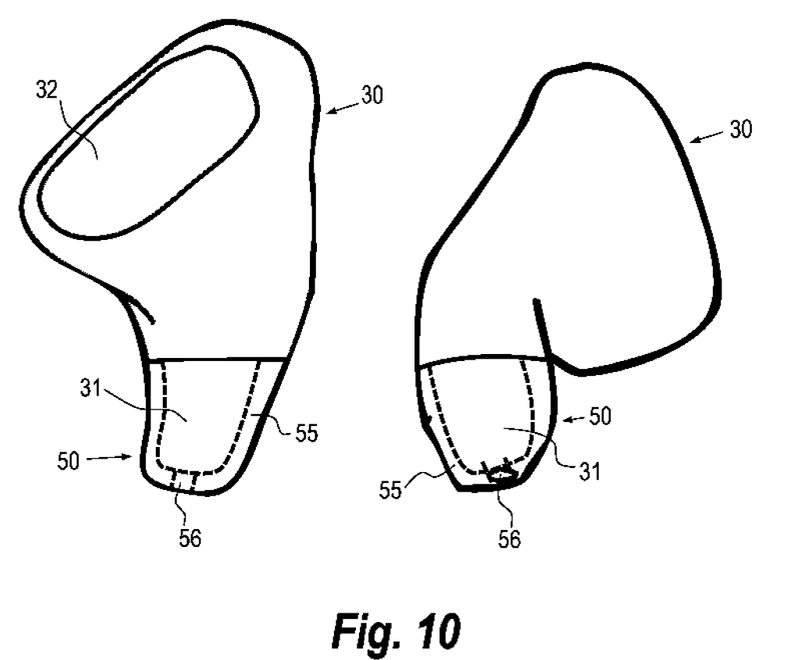
FIG. 10 illustrates two views of the shell of FIG. 7 provided with a resilient hearing aid part.

FIG. 10 illustrates the shell 30 of FIG. 7 provided with the resilient hearing aid component 50 of FIG. 9. The resilient component could be glued or press fitted to the hard recessed part 35 of the shell.

In a first example according to one embodiment of the invention an impression (e.g. in silicone) is made of the hearing aid user's ear and ear canal. This impression is scanned in a three dimensional scanner, thereby creating a set of data describing the shape of the auditory canal of the hearing aid user. These data are applied in a software package for building a model of an ear plug for a behind-the-ear hearing aid. Based on this model, a model of the mould for casting the hearing aid component is designed. This model will define the outer surface of the ear plug as well as the inner cavity for holding a receiver or a sound tube. Also any ventilation canal will be part of this design and must be part of the mould. The mould is now manufactured by an SLA rapid prototyping process. The mould is made in acrylic and the outer shell of the mould will be made in a thickness of 0.3 mm, while the inner part for defining the cavity for the receiver is often solid. A two component silicone is now mixed and injected into the mould. The silicone is hardening at room temperature and at a pressure of 5 bar for approximately 20 minutes. Following this the ear plug can be removed from the mould by crushing the outer shell of the mould and drawing the inner part of the mould out of the ear plug, thereby leaving the space in the ear plug for the receiver. Finally, the receiver can be mounted in the ear plug.

In a second example according to a second embodiment of the invention an impression (e.g. in silicone) is made of the hearing aid user's ear and ear canal. This impression is scanned in a three dimensional scanner, thereby creating a set of data describing the shape of the auditory canal of the hearing aid user. These data are applied in a software package for building a model of an in-the-ear hearing aid. This model will comprise one hard part forming the shell of the hearing aid, and one resilient part to be arranged on the outside of the hard part, where the resilient part is arranged such that it will be in touch with the wall of the hearing aid users ear canal. The hard part 30 of the shell is manufactured in approximately 0.7 mm acrylic, directly by an SLA rapid prototyping process. Based on the model of the resilient hearing aid component 50, a model of the mould 40 for casting the resilient component 50 is designed. The mould 40 is then manufactured by an SLA rapid prototyping process. The mould is made in acrylic and the outer layer 41 is made in a thickness of approximately 0.3 mm, while the inner core 42 for defining the inner dimensions of the resilient component will be made solid. The resilient hearing aid component 50 is now cast in the mould, by mixing a two component silicone and injecting this into the mould. The silicone sets at room temperature and at a pressure of 5 bar for approximately 20 minutes. Following this, first the inner core 42 of the mould is withdrawn, and then the outer layer 41 of the mould is crushed. The resilient material is now arranged on the recessed part 35 of the hard part 30 of the shell. The resilient material is fastened by glue to the recessed part. The other components of the hearing aid such as the electronic module, the battery compartment, the receiver and the microphone are arranged in the shell, whereupon a cover is placed over the opening 32 of the shell as shown in e.g. WO 98/47319. Thereby the hearing aid is finished.

We claim:

1. A method for manufacturing a hearing aid component adapted for fitting in the auditory canal of a hearing aid user, said hearing aid component having a covering of resilient material on at least part of its outside surface and said hearing aid component having an inner sound conveying part, said method comprising the steps of,
    acquiring data representing the shape of the auditory canal of a hearing aid user,
    forming a three-dimensional computer model of the shape of the hearing aid component based on the acquired data,
    forming a three-dimensional computer model of a mould for casting the covering,
    manufacturing said mould in a rapid prototyping process based on said three-dimensional computer model of the mould,
    casting the covering in the mould,
    removing the mould from the covering, and
    forming said hearing aid component by joining the covering with the inner sound conveying part,
    wherein said mould is provided with a wall thickness of 0.4 mm or less.

2. The method according to claim 1, comprising providing mould with a wall thickness of 0.3 mm or less.

3. The method according to claim 1, comprising selecting the material for said covering to be biocompatible.

4. The method according to claim 1, comprising providing said hearing aid component with an opening extending from the back end side to the front end side of the ear plug.

5. The method according to claim 1, wherein the step of forming a three-dimensional computer model of the shape of the hearing aid component comprises selecting said component as an ear plug.

6. The method according to claim 1, wherein the step of forming a three-dimensional computer model of the shape of the hearing aid component comprises selecting said component as a component of an in-the-ear hearing aid.

7. The method according to claim 1, comprising injecting said resilient material for the covering into said mould.

8. The method according to claim 1, comprising selecting said resilient material such that it has hardness below Shore 60A.

9. The method according to claim 1, comprising selecting said resilient material such that it has hardness in the range from Shore 20A to Shore 45A.

10. The method according to claim 1, wherein said casting is in the form of vulcanization of said resilient material.

11. The method according to claim 1, wherein said resilient material is selected to be silicone.

12. The method according to claim 11, wherein said silicone is a two component material vulcanizing at room temperature after mixing.

13. The method according to claim 1, wherein the step of removing the mould from the covering comprises crushing the mould.

14. The method according to claim 1, wherein the step of forming a three-dimensional computer model of a mould is adapted to include introducing crack initiation lines in the mould.

15. A hearing aid comprising a hearing aid component adapted for being placed in the auditory canal of a hearing aid user, said hearing aid component having a covering of a resilient material, on at least part of its outside surface, and having an inner sound conveying part, said hearing aid component being made by way of, acquiring data representing the shape of the auditory canal of a hearing aid user, forming a three-dimensional computer model of the shape of the hearing aid component based on the acquired data, forming a three-dimensional computer model of a mould for casting the covering, manufacturing said mould in a rapid prototyping process based on said three-dimensional computer model of the mould, casting the covering in the mould, removing the mould from the covering, and forming said hearing aid component by joining the covering with the inner sound conveying part, wherein said mould is provided with a wall thickness of 0.4 mm or less.

16. The hearing aid according to claim 15, wherein said resilient material has a hardness below Shore 60A.

* * * * *